O. H. IMAN.
PULLEY FRAME AND MOUNTING.
APPLICATION FILED NOV. 16, 1914.
1,153,923.
Patented Sept. 21, 1915.
2 SHEETS—SHEET 1.
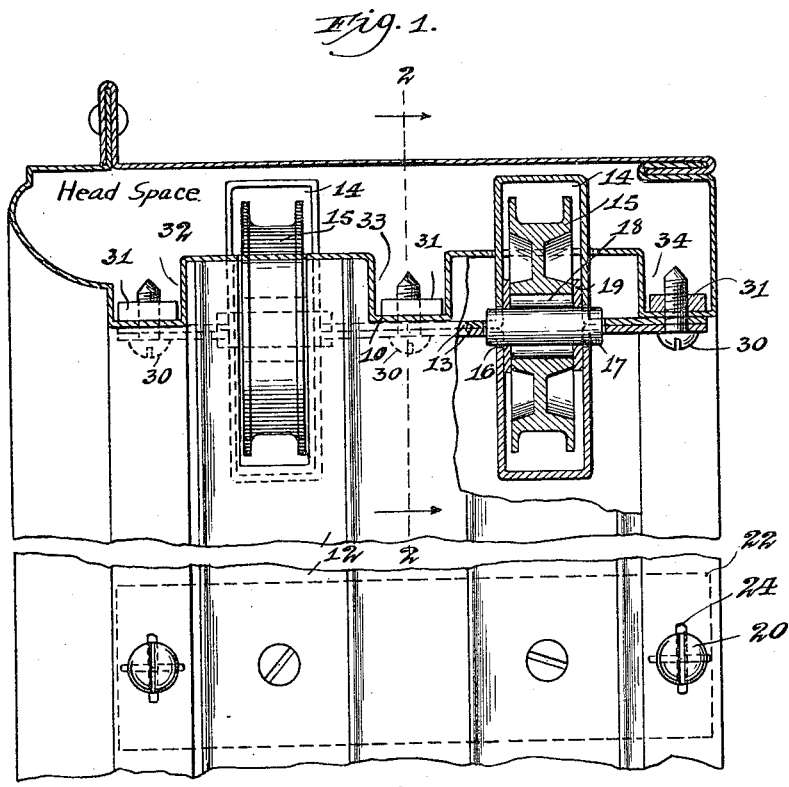
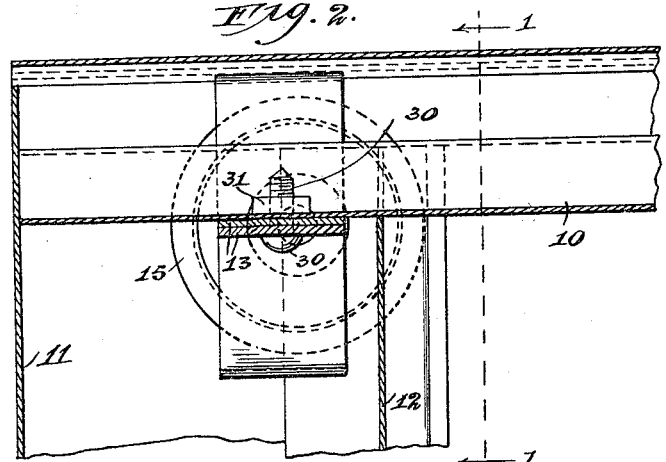

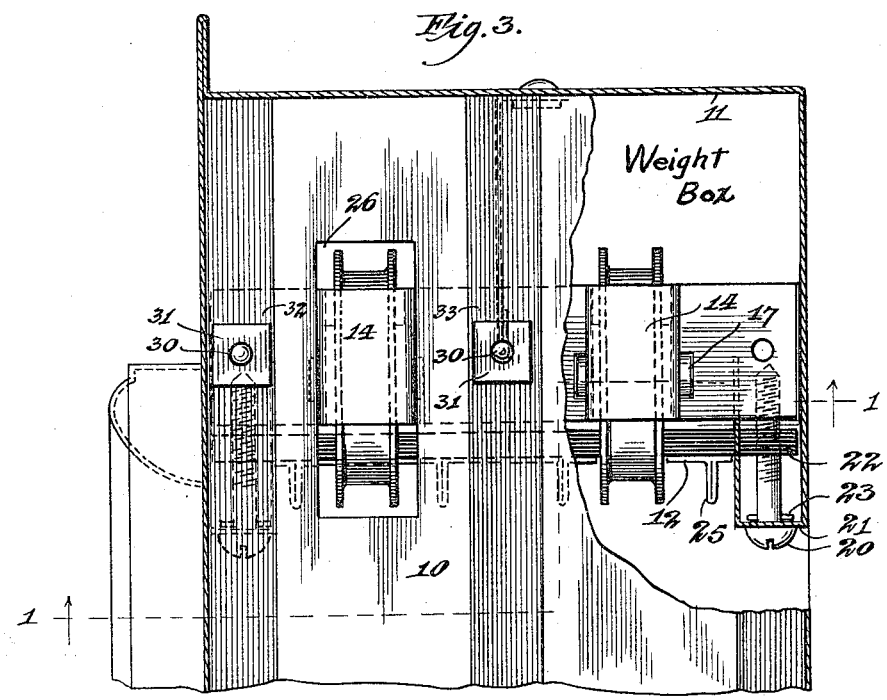
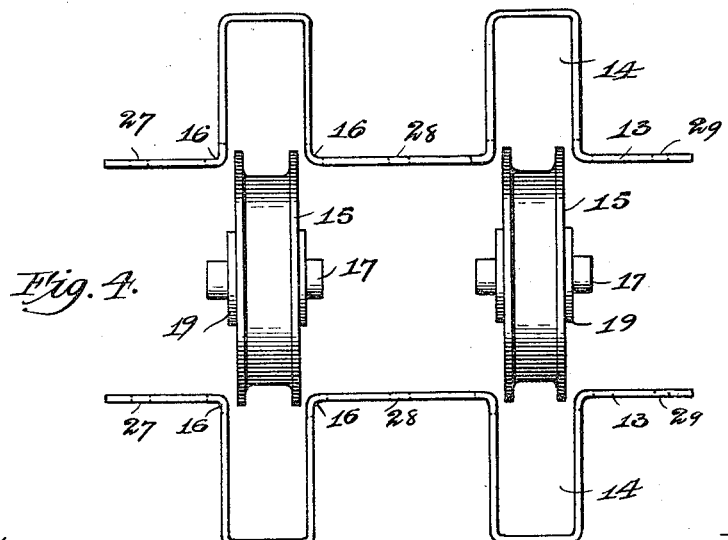

UNITED STATES PATENT OFFICE.

ORLA H. IMAN, OF CHICAGO, ILLINOIS, ASSIGNOR TO VOIGHTMANN & COMPANY, OF CHICAGO, ILLINOIS, A CORPORATION OF ILLINOIS.

PULLEY FRAME AND MOUNTING.

1,153,923.  Specification of Letters Patent.  Patented Sept. 21, 1915.

Application filed November 16, 1914. Serial No. 872,342.

*To all whom it may concern:*

Be it known that I, ORLA H. IMAN, a citizen of the United States, residing at Chicago, in the county of Cook and State of Illinois, have invented certain new and useful Improvements in Pulley Frames and Mountings, of which the following is a specification.

My invention relates to improvements in pulley frames and mountings, and, although susceptible of many applications and for various uses, is particularly well fitted for use in connection with window casings.

Among the salient objects of the invention are, to provide a pulley frame of such construction that when the component parts of the frame are assembled together it is impossible for the pulley pin or bearing to be shaken loose or moved out of its proper position and adjustment; to provide a pulley frame of such construction that the act of assembling the component parts of the frame at the same time locks the pulley and its bearing elements in proper position and correct bearing relation; to provide a pulley frame which can be manufactured from a comparatively small number of parts, and those of simple and economical design; to provide a pulley mounting of the class described which may be furnished with an ordinary plain bearing or with roller bearings with equal facility; to provide a pulley frame which is of symmetrical design so that it may be used in any position; to provide a pulley mounting for window frames constructed and organized in such a manner as to eliminate waste space at the top of the window casing; to provide a window casing and pulley mounting so organized as to permit of the pulley frames being hung from the head of the window; to provide a pulley mounting for a window casing so organized as to permit of the pulley mounting being removed readily without having to operate above the window head; to provide a pulley mounting so organized in connection with a window casing that the effective length of the weight-box is a maximum so as to permit the use of an attenuated balance weight; to provide a pulley mounting and window casing construction which shall be simple and economical in design while at the same time being practical and efficient in use; and, in general, to provide improved constructions of the types referred to.

The application of my invention may be exemplified by its embodiment in a window casing and pulley mountings therefor which are described herein and illustrated by the accompanying drawings, in which—

Figure 1 is an elevation of the corner of a metal window frame shown in section and taken on the lines 1—1 of Figs. 2 and 3; Fig. 2 is a section of Fig. 1 taken on the line 2—2; Fig. 3 is a plan view of Fig. 1, certain parts being broken away and shown in section; and Fig. 4 is a view showing the parts of the pulley frame disassembled and separated slightly the better to illustrate the construction.

Referring to the drawings, in the figures 10 represents the inner member of the top part of the window casing, this member usually being designated in the trade as a "head". This head extends all the way across between the two outer side members 11 of the window casing and is suitable permanently secured thereto. The inner side member 12 of the window casing, however, which in other windows might be termed a pulley stile, is constructed and organized in such a manner that it may be readily removed bodily from the window casing after the sashes have been removed and thus the weights and cords may be exposed for inspection and repair.

An important novel meature of my improved construction resides in the fact that the head of the window is extended to the outer side members so as to form a support from which the pulley frames may be detachably hung in a simple and efficient manner and in such a position that the headroom taken up by the window is reduced to the minimum, while at the same time ample vertical space is provided for the weights in the weight boxes. To this end I employ the novel and improved form of pulley frame herein shown, and mount the same in the manner to be described.

Describing the pulley frame, referring to Fig. 4 it will be noticed that the frame as a whole is composed of two pressed sheet metal members 13 which in the present instance are formed in a substantially similar manner and shaped to provide opposed pockets 14 which, when the members are secured together, surround the pulley wheels 15, two of which are mounted in a single frame. These mating pressed metal members 13 are adapted to be secured together so as to meet upon a plane substantially coincident with the axis of the pulley, the members being axially joined together by screws, spot-welding, or any other approved means. During the process of blanking and forming the members 13, the said members are punched or otherwise shaped to provide pairs of opposed pockets 16 located adjacent one another at the inner angles of the loops or pockets 14. These recessed apertures or pockets 16 are of such shape that when the members 13 are brought together, the pulley pins 17 are securely grasped between the opposed edges of the said pockets 16. The outer edges of the said adjacent pairs of pockets 16 are so spaced apart as to loosely admit the ends of the pulley pins 17 while at the same time forming abutments to limit the endwise movement of said pulley pins 17 when the frame is assembled together. The pulleys 15 may be of any type suitable for the particular purpose for which they are adapted, and said pulleys may have direct bearing on the pins 17, or, if desired, they can be equipped with ball or roller bearings, the latter being the case in the present instance. The rollers 18 may be seen from an inspection of the right-hand portion of Fig. 1, these rollers being limited in their endwise axial movement by circular washers 19 slipped on each end of the pulley pin 17 adjacent the pulley proper. It should be noted that the recesses 16 are so constructed as to cause the members 13 to be separated slightly when the latter are brought together upon the pins 17; thus, when the said members are united together their resiliency permits them to be pressed together into engagement with each other and grasp the members 17 tightly between.

As previously referred to, the stile 12 may be removed so as to gain access to the weights and pulleys. This is accomplished by means of the screws 20 which pass through a pair of hollow boxed-in flanges 21 formed on the front and back of the window casing, said screws engaging relatively heavy straps or bars 22 secured to the insides of the stiles. The screws 20 are prevented from coming out of the flanges 21 by means of retaining pins 23 driven in the screws just behind the said flanges in such a position as to allow said screws to rotate freely, while preventing axial movement of the same. When first inserting the screws 20 through the flanges 21, they are turned in such position that the pins 23 enter vertical slots 24; the normal position of the screws when in adjusted position being that shown in Figs. 1 and 3 with the retaining pins horizontal. In order to remove the side stiles 12 the screws 20 are first turned so as to move the side stiles 12 back an amount sufficient to disengage the interlocking weather ribs 25 from the sashes which are then removed; the screws are then withdrawn and the side stiles thus released are finally removed.

When the side stiles 12 are removed, access is obtained to the pulley frame which is hung from the head 10 in the following manner: Referring to Fig. 3, it will be seen that over each pulley the head 10 is provided with a rectangular slot 26 which is of such width as to admit the loops or pockets 14 of the pulley frame, and of a suitable length to admit the pulley 15 and its associated chain freely. In the members 13 there are punched three pairs of holes, 27, 28, 29, which register together when the members 13 are assembled and serve to admit the screws 30 which also pass through holes formed in the head 10 and engage rectangular nuts 31 carried on the upper side of the head. These nuts 31 are either permanently secured to the upper surfaces of the head in proper register with the holes therein, or they may be loosely supported thereon, rotation being prevented by the fit of the said nuts in the channels 32, 33 and 34 formed in the said head. It is obvious that in order to remove the pulley frame the only operation necessary is to remove the screws 30 after which the pulley frame can be dropped vertically downward and removed.

From the above description it will be observed that my improved construction is well adapted to carry out in a simple and efficient manner the objects previously set forth. It is also apparent that my construction is capable of being modified in certain of its details without departing from the spirit of the invention, and thus I do not wish to be limited in the use of my invention, except as specified in the appended claims.

I claim:

1. In a pulley frame, the combination of a pulley, a pair of resilient mating frame members provided with opposed adjacent faces located substantially at the axis of said pulley, a shaft for said pulley interposed between said mating frame members and having its ends of suitable size to slightly separate said mating frame members, and means for securing said mating frame members together to hold said opposed adjacent faces of said mating members substantially in contact with each other to resiliently grasp the ends of said shaft between said members to prevent its rotation.

2. In a pulley frame, the combination of a rotatable pulley, a pair of resilient similar mating frame members provided with opposed adjacent faces located substantially at the axis of said pulley, a shaft for said pulley having two cylindrical ends interposed between said mating frame members, said mating frame members being suitably conformed to admit the ends of said shaft and to interlock with said ends to prevent axial movement of said shaft, said members being forced together in intimate contact with each other to resiliently grasp said cylindrical ends and prevent rotary movement of said shaft.

3. In a pulley bearing frame, the combination with the pulley, of a relatively stationary shaft therefor, and a pair of mating frame members adapted to be secured together so as to completely surround said pulley and to meet substantially at the axis of said shaft, the said members being formed with a pair of opposed recesses adapted to meet together and grasp the end of said shaft and prevent rotation thereof, said members having interlocking engagement with said shaft to limit the endwise movement thereof.

4. In a pulley bearing member, the combination of a pulley, a relatively stationary shaft therefor, and a pair of similar pressed metal mating frame members adapted to be secured together and to meet at substantially the axis of said shaft, the said members being so shaped as to include and surround said pulley when secured together, and also being provided with two pairs of opposed recesses adapted to engage the ends of said shaft and prevent rotation thereof, the outer ends of said recesses forming abutments to limit the endwise movement of said shaft in said frame.

5. In a metal window frame, the combination of a head adapted to extend over the weight-box outwardly beyond the side stile of the window, said head being provided with an aperture therein, a pulley adapted to enter said aperture, a frame for said pulley detachably hung from and secured to said head, and means for securing said frame to the extension to said head.

6. In a metal window frame, the combination of a head rigidly secured to the frame and adapted to extend across between two outer side frame members of said frame, said head being provided with apertures therein over the weight-boxes, said apertures being adapted to admit the weight pulleys from the under side of said head, a pair of pulleys, and a common frame support for said pulleys adapted to be hung from the under side of said head and detachably secured thereto.

7. In a metal window frame, the combination of a head rigidly secured to the frame and adapted to extend beyond the side stiles of the casing and across the weight boxes substantially to and between the two outer side frame members of said frame, said head being provided with apertures therein over the weight boxes adapted to admit the weight pulleys from the under side of said head, a pair of pulleys to enter said apertures, a common frame support for said pulleys, and screws insertible from the under side of said head and within the weight boxes for detachably securing said common frame support to the under side of said head.

8. In a pulley bearing member, the combination of a pulley, a relatively stationary shaft therefor and a pair of similarly formed pressed metal mating frame members adapted to completely surround said pulley in a plane substantially at right angles with their mating plane, and adapted to be secured together and to meet at substantially the axis of said shaft, and also being provided with two pairs of opposed recesses adapted to engage the ends of said shaft and prevent rotation thereof with reference to the frame, said frame members being provided at their ends adjacent the mating plane with interlocking engagement with said shaft to prevent endwise movement thereof with reference to said mating frame members.

ORLA H. IMAN.

Witnesses:
   Cyril A. Soans,
   Emilie Rose.

Copies of this patent may be obtained for five cents each, by addressing the "Commissioner of Patents, Washington, D. C."